United States Patent
Liu et al.

(10) Patent No.: US 12,224,846 B2
(45) Date of Patent: Feb. 11, 2025

(54) AIR TO GROUND WIRELESS REPEATER/RELAY SYSTEM

(71) Applicant: T-Mobile Innovations LLC, Overland Park, KS (US)

(72) Inventors: Jun Liu, Sammamish, WA (US); Egil Arnfinn Gronstad, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 340 days.

(21) Appl. No.: 17/673,151

(22) Filed: Feb. 16, 2022

(65) Prior Publication Data
US 2023/0261734 A1    Aug. 17, 2023

(51) Int. Cl.
| | | |
|---|---|---|
| *H04B 7/185* | (2006.01) | |
| *H01Q 3/02* | (2006.01) | |
| *H04W 16/28* | (2009.01) | |
| *H04W 84/06* | (2009.01) | |

(52) U.S. Cl.
CPC ........ *H04B 7/18504* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 11,689,615 B2 * | 6/2023 | Bhatt | H04W 4/80 |
| | | | 709/219 |
| 2023/0410028 A1 * | 12/2023 | O'Toole | G06Q 10/0833 |
| 2024/0014890 A1 * | 1/2024 | Beale | H04B 7/18519 |

FOREIGN PATENT DOCUMENTS

| | | | | |
|---|---|---|---|---|
| WO | WO-2014160997 A1 * | 10/2014 | | H04B 7/18504 |
| WO | WO-2016099920 A1 * | 6/2016 | | H04B 7/18504 |

* cited by examiner

*Primary Examiner* — Pablo N Tran
(74) *Attorney, Agent, or Firm* — SHOOK, HARDY & BACON L.L.P.; Elena K. McFarland

(57) ABSTRACT

Systems and methods for controlling the air to ground network coverage in an underserved area include an aerial vehicle and control circuitry communicatively coupled to relay circuitry, antenna circuitry, and a ground site. The control circuitry is structured to receive signal data corresponding to a radio signal, the relay circuitry structured to convert the radio signal into a subsequent signal, determine one or more airline schedules and one or more flight statuses associated with an underserved area, based on the one or more airline schedules and the one or more flight statuses determined, determine an aerial vehicle location as the aerial vehicle navigates to the underserved area, and generate a command to activate, via the antenna circuitry, transmission of air to ground network coverage based on the subsequent signal to the underserved area when the aerial vehicle location is in the underserved area.

20 Claims, 4 Drawing Sheets

AIR TO GROUND WIRELESS REPEATER/RELAY SYSTEM

SUMMARY

The present disclosure is directed, in part, to controlling the air to ground network coverage in an underserved area, substantially as shown in and/or described in connection with at least one of the figures, and as set forth more completely in the claims.

In aspects set forth herein, a user device is connected to a telecommunication network. Typically, a user device is inoperable in an underserved area (e.g., a national park). The user device is unable to connect to a cell site such that the subscriber is unable to utilize the services (e.g., 5G, voice, data, location data, etc.) provided by a telecommunications provider. However, here, control circuitry determines an aerial vehicle location as the aerial vehicle navigates to the underserved area and generates a command to activate transmission of air to ground network coverage to the underserved area when the aerial vehicle location is in the underserved area which provides efficient air to ground network coverage in areas where terrestrial network coverage is not available and enables the user device to utilize the services provided by telecommunication providers in the underserved area.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
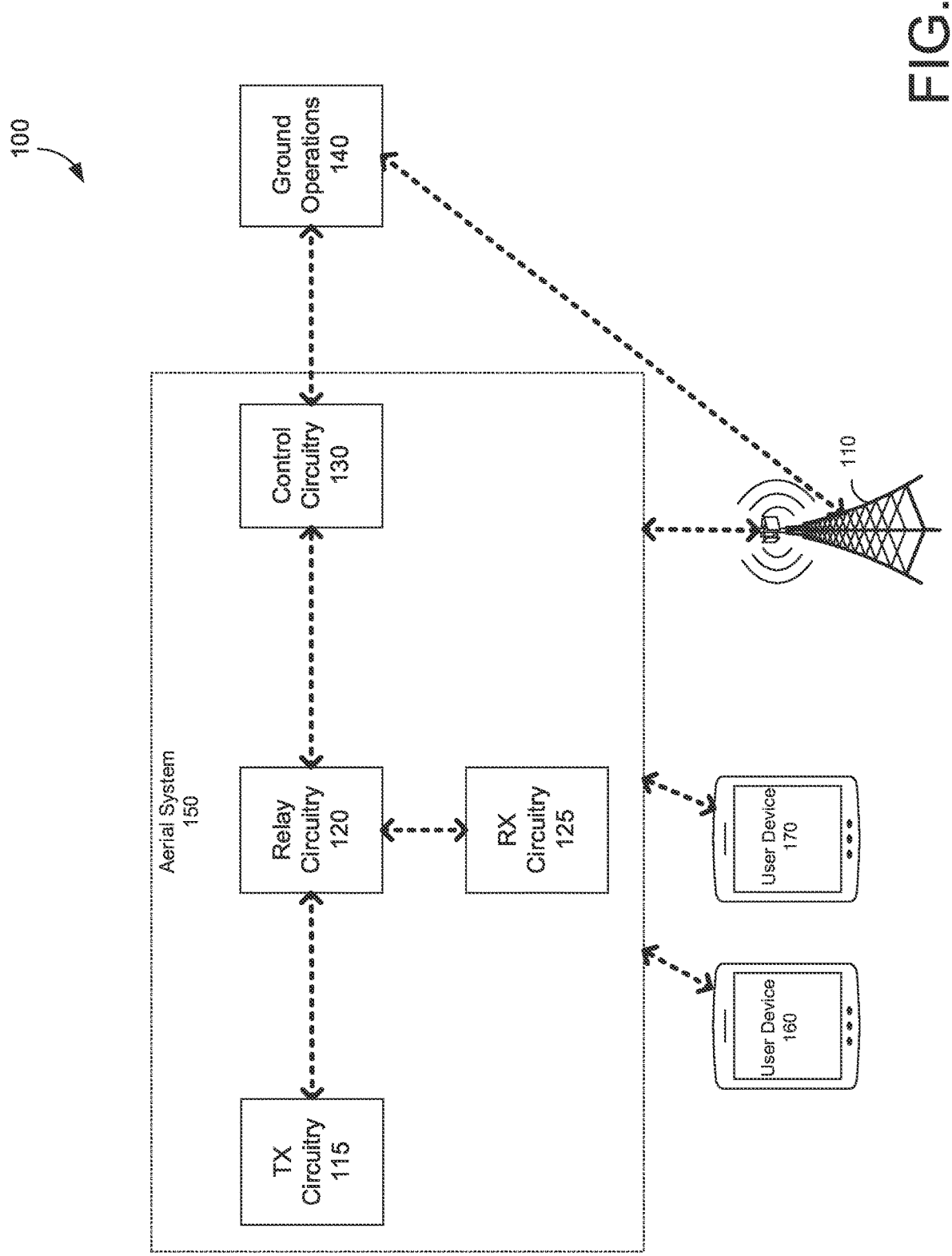
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for controlling the air to ground network coverage in an underserved area. Signal data corresponding to a radio signal is received. One or more airline schedules and one or more flight statuses associated with an underserved area are determined. An aerial vehicle location is determined as an aerial vehicle navigates to the underserved area based on the one or more airline schedules and the one or more flight statuses. A command to activate transmission of air to ground network coverage is generated based on the subsequent signal to the underserved area when the aerial vehicle location is in the underserved area.

Advantageously, controlling the air to ground network coverage in an underserved area enables one or more user devices to activate or otherwise utilize services (e.g. LTE, 5G, 6G, voice, location, data, etc.) in the underserved area provided by telecommunication providers.

In one aspect, a method is provided for controlling the air to ground network coverage in an underserved area. The method includes receiving, by a control system communicatively coupled to relay circuitry, antenna circuitry, and a ground site, signal data corresponding to a radio signal. The relay circuitry is structured to convert the radio signal into a subsequent signal. The method also includes determining one or more airline schedules and one or more flight statuses associated with an underserved area. The method also includes determining an aerial vehicle location as an aerial vehicle navigates to the underserved area based on the one or more airline schedules and the one or more flight statuses determined. The method further includes generating a command to activate transmission of air to ground network coverage based on the subsequent signal to the underserved area when the aerial vehicle location is in the underserved area.

In another aspect, a computer-readable storage media having computer-executable instructions embodied thereon is provided that, when executed by one or more processors, cause the processors to perform various steps. The processors are caused to receive, by a control system communicatively coupled to relay circuitry, antenna circuitry, and a ground site, signal data corresponding to a radio signal. The relay circuitry structured to convert the radio signal into a subsequent signal. The processors are also caused to determine one or more airline schedules and one or more flight statuses associated with an underserved area. The processors are also caused to determine an aerial vehicle location as an aerial vehicle navigates to the underserved area based on the one or more airline schedules and the one or more flight statuses determined. The processors are further caused to generate a command to activate, via the antenna circuitry, transmission of air to ground network coverage based on the subsequent signal to the underserved area when the aerial vehicle location is in the underserved area.

In yet another aspect, a system is provided for controlling the air to ground network coverage in an underserved area. The system includes an aerial vehicle and control circuitry communicatively coupled to relay circuitry, antenna circuitry, and a ground site. The control circuitry receives signal data corresponding to a radio signal. The relay circuitry is structured to convert the radio signal into a subsequent signal. The control circuitry also determines one or more airline schedules and one or more flight statuses associated with an underserved area. The control circuitry also determines an aerial vehicle location as the aerial vehicle navigates to the underserved area based on the one or more airline schedules and the one or more flight statuses determined. The control circuitry further generates a command to activate, via the antenna circuitry, transmission of air to ground network coverage based on the subsequent signal to the underserved area when the aerial vehicle location is in the underserved area.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media may include both volatile and nonvolatile media, non-transitory and transitory media, removable and non-removable media, and contemplate media readable by a database, a switch, and various other network devices. Computer-readable media includes media implemented in any way for storing information. Examples of stored information include computer-useable instructions, data structures, programmatic circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, non-transitory media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, laptop computer, tablet, netbook, mobile phone, smart phone, personal digital assistant, wearable device, augmented reality device, fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G or 6G and having backward compatibility with prior access technologies, current UE capable of using 5G or 6G and lacking backward compatibility with prior access technologies, and legacy UE that is not capable of using 5G or 6G.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 2G, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 160 and 170. In some embodiments, the network environment 100 may include a telecom network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The telecom network included in the network environment 100 may include or otherwise may be accessible through a cell site (e.g., the cell site 110) and/or an aerial system (e.g., the aerial system 150) as described herein. The cell site may include one or more antennas, base transmitter stations, radios, transmitter/receivers, digital signal processors, control electronics, GPS equipment, power cabinets or power supply, base stations, charging stations, etc. such that the cell site may provide a communication link between one or more user devices (e.g., the user devices such as the user devices 160 and 170) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone (NSA) mode. In the non-stand alone mode the network environment 100 may take the form of, for example, an E-UTRAN New Radio-Dual Connectivity (EN-DC) network. In an EN-DC network, a user device may connect to or otherwise access, via an air to ground network, a 4G, LTE, 5G, or any other suitable network. In the stand alone mode, the telecom network may take the form of a 5G, 6G, or any other suitable network.

In some embodiments, the network environment 100 may include one or more nodes communicatively coupled to one or more aerial systems and/or one or more user devices such that the node(s) may transmit to the one or more aerial systems and receive requests and/or data from the user device(s). The one or more nodes may include a Next Generation Node B (e.g., gNodeB or gNB) or any other suitable node. The one or more nodes may correspond to one or more frequency bands within which the user device(s) may connect to the network environment such as, but not limited to, a telecommunication network or a portion thereof.

In some embodiments, the node(s) may be included within the cell site (e.g., the cell site 110), external to the cell site, or otherwise communicatively coupled to the cell site. The node(s) may allocate radio frequency, or a portion thereof, to user device(s).

In some embodiments, the user device(s) may take the form of a wireless or mobile device capable of communication via the network environment 100. For example, the user device 170 may take the form of a mobile device capable of communication via a telecom network such as, but not limited to, a wireless telecommunication network. In this regard, the user device(s) may be any computing device that communicates by way of a network, for example, a 2G, 3G, 4G, LTE, WiMAX, Wi-Fi, 5G, 6G, or any other type of network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunication providers that provide services (e.g. LTE, 5G, 6G, voice, location, data, etc.) to one or more user devices. For example, the user devices 160 and 170 may be subscribers to a telecommunication service provider, in which the devices are registered or subscribed to receive voice and data services (e.g., receive content that may be streamed, downloaded, etc.) over the network environment 100. The network environment 100 may include any communication network providing voice and/or data service(s), such as, for example, a Wi-Fi network, 4G network (LTE, WiMAX, HSDPA), 5G network, or 6G network.

The network environment 100 may include the aerial system 150 (e.g., an onboard system included within and/or communicatively coupled to an aerial vehicle). As used herein, the term aerial vehicle may be used to refer to an aircraft (e.g., a helicopter, gyroplane, airship, airplane, powered parachute, hot air balloon, etc.) or any other vehicle structure for air flight. The aerial system 150 may include various systems, circuitry, components, etc. such as, but not limited to, transmission circuitry (e.g., the TX circuitry 115), relay circuitry (e.g., the relay circuitry 120), receiver circuitry (e.g., the RX circuitry 125), and/or control circuitry (e.g., the control circuitry 130). The receiver circuitry 125 may include or otherwise may take the form of a receiver antenna (e.g., RX antenna). The receiver circuitry 125 may receive a radio signal (e.g., a donor signal) from the ground site (e.g., the cell site 110) as described herein with reference to FIG. 2.

In embodiments that include the relay circuitry 120, the relay circuitry 120 may include or otherwise may take the form of a relay, repeater, or any other suitable circuitry. The relay circuitry 120 may receive and/or retrieve the radio signal (e.g., the donor signal) and convert radio signal into one or more subsequent signals. For example, the relay circuitry 120 may convert the radio signal to a transmission (TX) frequency band for transmission.

In some embodiments, the transmission circuitry 115 may include or otherwise may take the form of a transmission antenna (e.g., TX antenna). The transmission antenna may form one or more transmission beams, transmission patterns, etc. to provide the air to ground network coverage. The transmission antenna may one or more components such as include one or more rods, wires, conductors, etc. The conductor may support or otherwise transfer an electric current. In some embodiments, the conductor may convert the electric current into radio frequency radiation. The transmission antenna may transmit at specific frequencies and direct outgoing radio waves.

The control circuitry 130 may include one or more control systems. In some embodiments, the control circuitry 130 may be included within or otherwise communicatively coupled to an aerial vehicle (e.g., the aerial vehicle 220 depicted in FIG. 2) and/or the ground operations 140. The control circuitry may provide data to the relay circuitry, receiver circuitry, and/or the transmission circuitry. For example, the control circuitry 130 may provide information to the relay, receiver antenna, and/or the transmission antenna to control the orientation of each respective antenna. In some examples, the control circuitry may be communicatively coupled to the ground operations 140 (e.g., the ground operations center) to coordinate among aerial vehicles in real-time or near real-time. In this regard, the control circuitry 130 may include transmission antenna (e.g., TX antenna) control circuitry that may control the beam direction based on the aerial vehicle location and/or the underserved area to be covered. As used herein, the term "underserved area" may include an area associated with at least one of a mountain, hilly terrain, national park (e.g., the national park 280 depicted in FIG. 2), dense foliage (e.g., the dense foliage 290 depicted in FIG. 2), forest, desert, dead zone, remote tourist destination, rural area, or body of water (e.g., an ocean, river, lake, pond, etc.).

The control circuitry 130 may include receiver antenna (e.g., RX antenna) control circuitry that may control the alignment of the receiver antenna to the ground operations 140 (e.g., the ground station). In some embodiments, the receiver antenna control circuitry may control the donor selection. Alternatively or additionally, the control circuitry 130 may include relay control circuitry. The relay control circuitry may control the time to activate (e.g., start) and/or deactivate (e.g., stop) the transmission (e.g., the TX transmission) of the subsequent signal.

The ground operations 140 may provide scheduling and/or route information to the aerial vehicle(s). In some examples, the ground operations may receive and/or store operation data.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
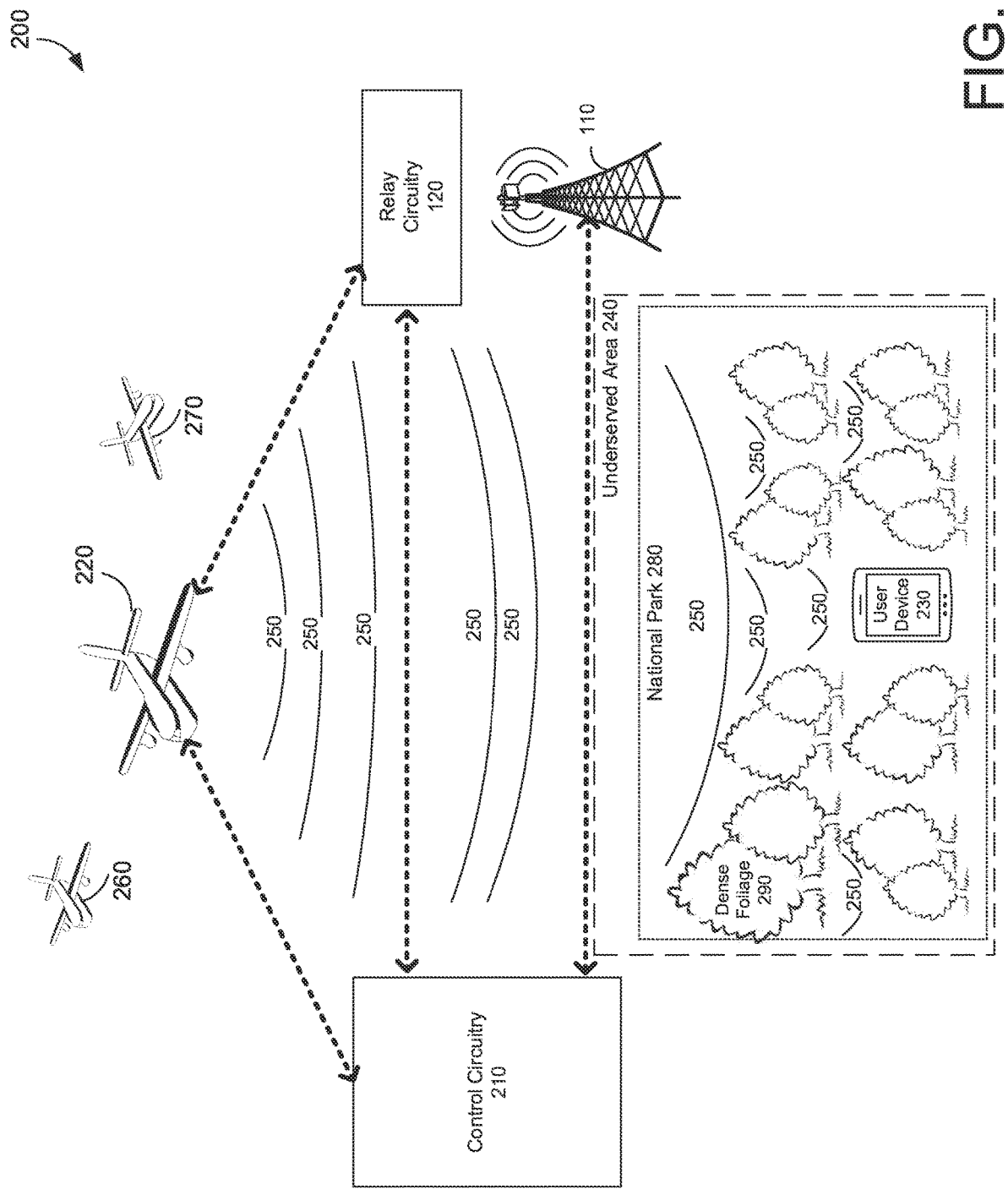
FIG. 2 is a diagram of a network environment operable in an underserved area in accordance with an example embodiment.

FIG. 2 is a diagram of the network environment 200 (e.g., a telecommunication environment such as, but not limited to, a wireless telecommunication environment operable in an underserved area) according to an example embodiment. In the present embodiment, the network environment 200 includes the cell site 110, relay circuitry 120, control circuitry 210, aerial vehicle 220, and user device 230. Although some of the components in the network environment 200 are depicted as single components (e.g., a single control circuitry, cell site, user device, etc.), in some embodiments, the network environment 200 may include a plurality of such components. The control circuitry 210 may be included within the cell site 110, external to the cell site 110, and/or otherwise communicatively coupled to the cell site 110 directly or indirectly. Alternatively or additionally, the control circuitry 210 may be included within the aerial vehicle 220, external to the aerial vehicle 220, and/or otherwise communicatively coupled to the aerial vehicle 220 directly or indirectly. The control circuitry 210 may be included within the control circuitry 130 of FIG. 1, external to the control circuitry 130, and/or otherwise communicatively coupled to the control circuitry 130 directly or indirectly. In some examples, the control circuitry 210 may be included within the user device 170, external to the user device 170, and/or otherwise communicatively coupled to the user device 170 directly or indirectly.

In some embodiments, the control circuitry (e.g., the control circuitry 210) may receive signal data corresponding to a radio signal. The signal data may include data associated with a radio signal such as, but not limited to, signal strength. The control circuitry 210 may be communicatively coupled to relay circuitry, antenna circuitry, a ground site, etc. as described herein with reference to FIG. 1. The relay circuitry 120 (e.g., a relay, repeater, and/or any other suitable circuitry) may be structured to convert the radio signal into a subsequent signal (e.g., a converted signal). The ground site may include or may otherwise take the form of one or more cell sites (e.g., the cell site 110), Next Generation nodes, etc. In some examples, the ground site may provide the radio signal to the aerial vehicle (e.g., the aerial vehicle 220). Alternatively or additionally, the relay circuitry 120 may convert the radio signal into a subsequent signal and provide the subsequent signal to the aerial vehicle 220.

The control circuitry 210 may determine one or more airline schedules and one or more flight statuses associated with the underserved area. The one or more flight statuses may be determined in real-time or near real-time. In some embodiments, the control circuitry 210 may determine a flight status of an aerial vehicle using GPS, near field communication, triangulation techniques, wireless networks, and/or telecommunication networks in real-time and/or near real-time. The airline schedule(s) and the flight status(es) (e.g., the real-time flight status) may be utilized to control the onboard system (e.g., the aerial system 150) to ensure the air to ground network coverage 250.

In some embodiments, the control circuitry 210 may determine an aerial vehicle location as an aerial vehicle navigates to the underserved area 240 based on the one or more airline schedules and the one or more flight statuses determined. The airline schedule(s) and/or the flight status(es) may be determined based on data provided one or more external flight systems (e.g., one or more third party flight systems that track the location and schedule of one or more airplanes). The control circuitry 210 may determine the aerial vehicle location using GPS, near field communication, triangulation techniques, wireless networks, and/or telecommunication networks in real-time and/or near real-time. The aerial vehicle location may correspond to a longitude location and a latitude location of the aerial vehicle in real-time or near real-time. Accordingly, the control circuitry may track the aerial vehicle location using sequentially determined pairs of longitude location(s) and/or latitude location(s) of the aerial vehicle generated or otherwise determined at one or more positions as the aerial vehicle navigates in a direction toward one or more underserved areas.

In some embodiments, the control circuitry may generate a command to activate transmission of the air to ground network coverage 250 based on the subsequent signal (e.g., the converted signal) to the underserved area 240 when the aerial vehicle location is in the underserved area 240. For example, when the aerial vehicle 220 (e.g., the airplane) arrives to the underserved area 240, the control circuitry may generate a command to activate transmission of the subsequent signal from the air to the ground. In some embodiments, the air to ground network coverage may range from a calibratable floor (e.g., 20 km) to a calibratable ceiling (e.g., 30 km). The range of the air to ground network coverage may vary based on the antenna beam width and/or the aerial vehicle cruising altitude. Advantageously, controlling the air to ground network coverage in an underserved area provides efficient network coverage in areas where cell sites are not permitted such that one or more user devices (e.g., the user device 230) are enabled to activate or otherwise utilize services (e.g. 4G, 5G, 6G, voice, location, data, etc.) in the underserved area provided by telecommunication providers.

In some examples, the one or more antennas may be moved, via the control circuitry 210, between an active state or an inactive state based on at least one of the aerial vehicle location or the one or more flight statuses corresponding to one or more aerial vehicles (e.g., the aerial vehicles 260 and 270) in or proximate to the underserved area (e.g., the underserved area 240). For example, the transmitter (TX) antenna power on and/or power off control may be based on the airplane location and the TX antenna status of one or more neighbor airplanes. One or more antenna beam orientations may be directed based on at least one of the underserved area or the aerial vehicle location. For example, a transmitter antenna beam orientation may be based on the underserved area(s) to be covered and/or the aerial vehicle location (e.g., the airplane location). In some embodiments, one or more antennas may be controlled, via the control circuitry 210, based on at least one of a location of the ground site, signal strength of a ground donor cell, the aerial vehicle location, or an aerial vehicle altitude. The receiver (RX) antenna, for example, may be controlled, via the control circuitry 210, based on the location of the ground station, signal strength of the ground donor cell, the airplane location, the airplane altitude, etc. The control circuitry 210 (e.g., transmission antenna control circuitry) may transmit at various areas (e.g., various underserved areas) to steer the antenna properly.

In embodiments wherein a plurality of aerial vehicles (e.g., the aerial vehicles 220, 260, and 270) are in the underserved area 240, the control circuitry 210 may manage the plurality of aerial vehicles such that the plurality of aerial vehicles do not interfere with each other. For example, the control circuitry 210 may determine which aerial vehicle (e.g., which airplane) from which to activate transmission of the air to ground network coverage. The control circuitry 210 may determine the aerial vehicle from which to activate transmission of the air to ground network coverage by analyzing one or more inputs. The input(s) may include, but are not limited to, the distance between the ground and each aerial vehicle (e.g., each airplane), the signal strength of the cell site (e.g., the donor cell site such as the cell site 110), the current status of the transmission circuitry 115 of each aerial vehicle (e.g., whether the transmission circuitry is being used for one or more other underserved areas), the flight direction of the aerial vehicle, etc.

Figure 3:
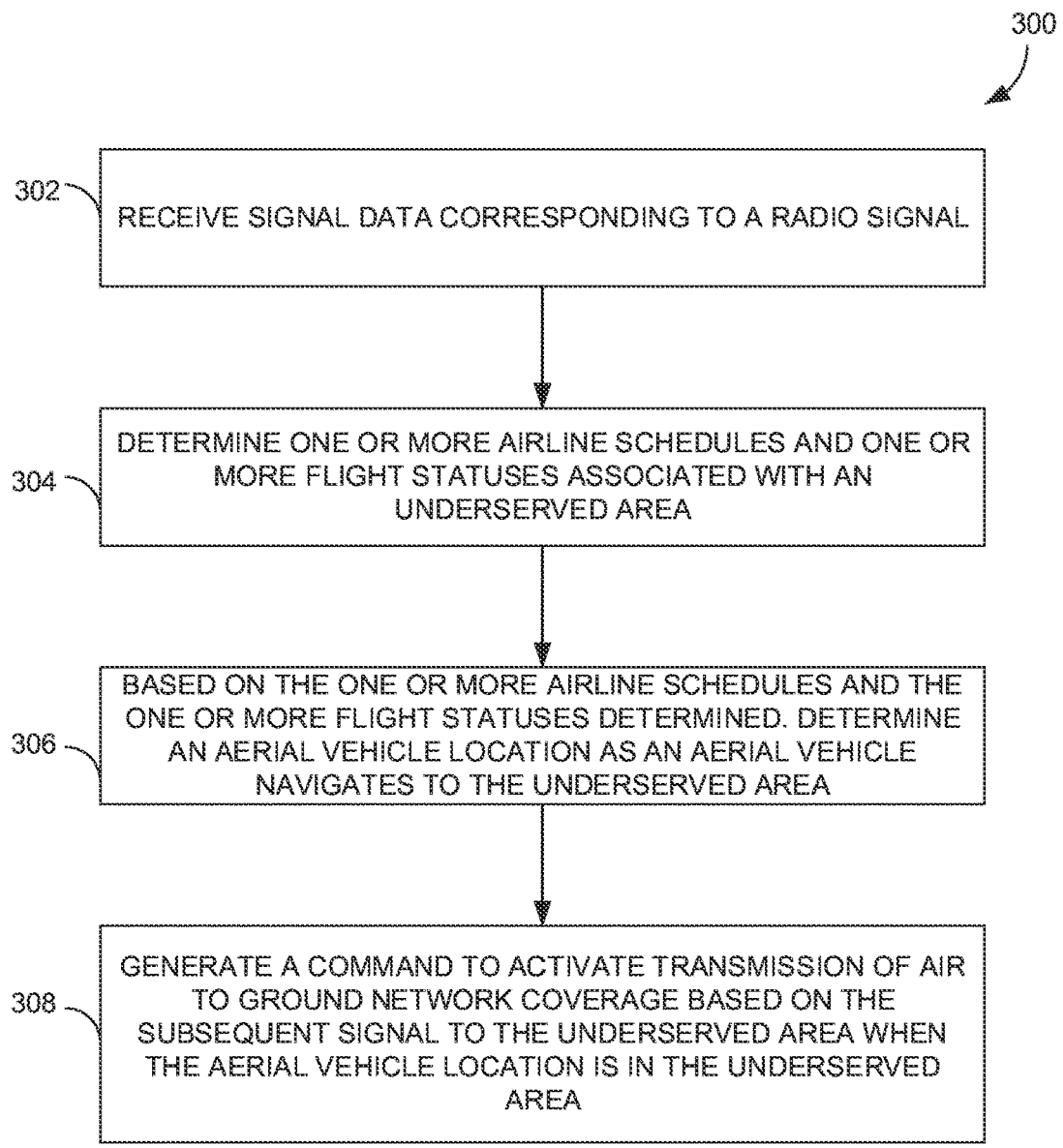
FIG. 3 depicts a flowchart of an exemplary method for controlling the air to ground network coverage in an underserved area in accordance with an example embodiment.

FIG. 3 depicts a flow diagram of an exemplary method 300 for controlling the air to ground network coverage in an underserved area, in accordance with implementations of the present disclosure. Initially at block 302 signal data corresponding to a radio signal is received by the control circuitry. The control circuitry may be communicatively coupled to relay circuitry. The relay circuitry may convert the radio signal into a subsequent signal (e.g., into a converted signal).

At block 304, one or more airline schedules and one or more flight statuses associated with an underserved area are determined in real-time or near real-time. In this regard, the control circuitry may determine one or more flight statuses of an aerial vehicle using, for example, wireless networks and/or telecommunication networks.

An aerial vehicle location is determined based on the one or more airline schedules and the one or more flight statuses as the aerial vehicle navigates to the underserved area at 306. The aerial vehicle location may correspond to a longitude location and a latitude location of the aerial vehicle in real-time or near real-time. The longitude location and the latitude location of the aerial vehicle may be determined as the aerial vehicle navigates toward one or more underserved areas.

In some embodiments, a command to activate transmission of the air to ground network coverage to the underserved area is generated based on the subsequent signal when the aerial vehicle location is in the underserved area at block 308. In some examples, the range of the ground network coverage may vary based on the antenna beam width and/or the aerial vehicle cruising altitude.

Figure 4:
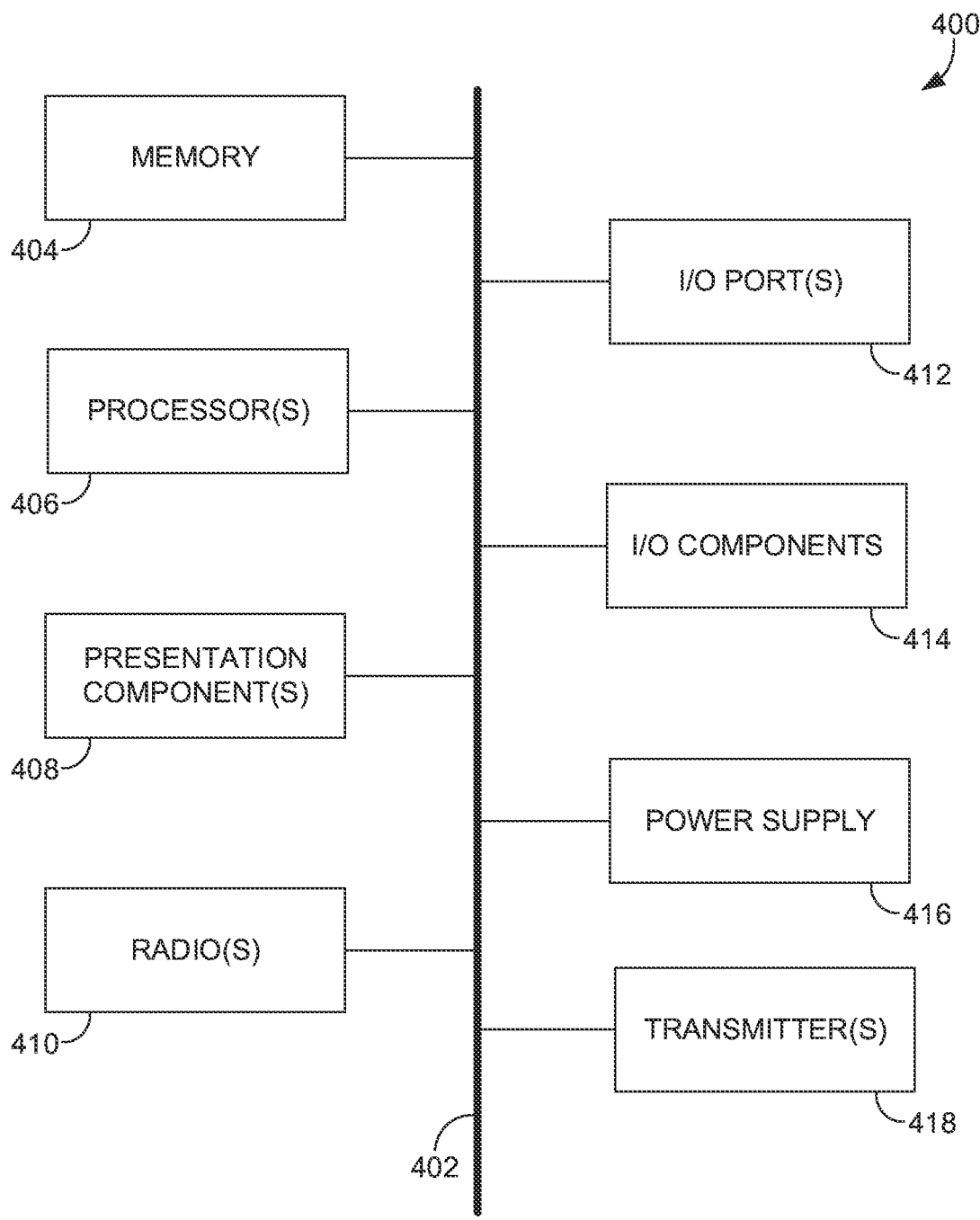
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s) 418. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for controlling, via a telecommunications network, air to ground network coverage in an underserved area, the method comprising:
   receiving, by a control system communicatively coupled to relay circuitry, antenna circuitry, and a ground site, signal data corresponding to a radio signal, the relay circuitry structured to convert the radio signal into a subsequent signal;
   determining one or more airline schedules and one or more flight statuses associated with an underserved area;
   based on the one or more airline schedules and the one or more flight statuses determined, determining an aerial vehicle location as an aerial vehicle navigates to the underserved area; and
   generating a command to activate transmission of air to ground network coverage based on the subsequent signal to the underserved area when the aerial vehicle location is in the underserved area.

2. The method of claim 1, wherein the aerial vehicle comprises an aircraft.

3. The method of claim 1, wherein the one or more flight statuses are generated in real-time or near real-time.

4. The method of claim 1, wherein one or more antennas are controlled based on at least one of a location of the ground site, signal strength of a ground donor cell, the aerial vehicle location, or an aerial vehicle altitude.

5. The method of claim 1, wherein the ground site comprises one or more Next Generation nodes.

6. The method of claim 1, wherein one or more antenna beam orientations are directed based on at least one of the underserved area or the aerial vehicle location.

7. The method of claim 1, wherein one or more antennas are moved between an active state or an inactive state based on at least one of the aerial vehicle location or the one or more flight statuses corresponding to one or more aerial vehicles in the underserved area.

8. Non-transitory computer-readable storage media having computer-executable instructions embodied thereon that, when executed by one or more processors, cause the processors to:
   receive, by a control system communicatively coupled to relay circuitry, antenna circuitry, and a ground site, signal data corresponding to a radio signal, the relay circuitry structured to convert the radio signal into a subsequent signal;
   determine one or more airline schedules and one or more flight statuses associated with an underserved area;
   based on the one or more airline schedules and the one or more flight statuses determined, determine an aerial vehicle location as an aerial vehicle navigates to the underserved area; and
   generate a command to activate, via the antenna circuitry, transmission of air to ground network coverage based on the subsequent signal to the underserved area when the aerial vehicle location is in the underserved area.

9. The non-transitory computer-readable storage media of claim 8, wherein the underserved area comprises an area associated with at least one of a forest, national park, mountain, desert, or rural area.

10. The non-transitory computer-readable storage media of claim 8, wherein the one or more flight statuses are generated in real-time or near real-time.

11. The non-transitory computer-readable storage media of claim 8, wherein one or more antennas are controlled based on at least one of a location of the ground site, signal strength of a ground donor cell, the aerial vehicle location, or an aerial vehicle altitude.

12. The non-transitory computer-readable storage media of claim 8, wherein the ground site comprises one or more Next Generation nodes.

13. The non-transitory computer-readable storage media of claim 8, wherein one or more antennas are moved between an active state or an inactive state based on at least one of the aerial vehicle location or the one or more flight statuses corresponding to one or more aerial vehicles in the underserved area.

14. A system for controlling the air to ground network coverage in
   an underserved area, the system comprising:
      an aerial vehicle; and
      control circuitry communicatively coupled to relay circuitry, antenna circuitry, and a ground site, the control circuitry structured to:
      receive signal data corresponding to a radio signal, the relay circuitry structured to convert the radio signal into a subsequent signal;
      determine one or more airline schedules and one or more flight statuses associated with an underserved area;
      based on the one or more airline schedules and the one or more flight statuses determined, determine an aerial vehicle location as the aerial vehicle navigates to the underserved area; and
      generate a command to activate, via the antenna circuitry, transmission of air to ground network coverage based on the subsequent signal to the underserved area when the aerial vehicle location is in the underserved area.

15. The system of claim 14, wherein the underserved area comprises an area associated with at least one of a forest, national park, mountain, or rural area.

16. The system of claim 14, wherein the aerial vehicle comprises an aircraft.

17. The system of claim 14, wherein the ground is to provide the radio signal to the aerial vehicle.

18. The system of claim 14, wherein the one or more flight statuses are generated in real-time or near real-time.

19. The system of claim 14, wherein the aerial vehicle comprises at least one of the control circuitry, relay circuitry, or antenna circuitry.

20. The system of claim 14, wherein the ground site comprises one or more Next Generation nodes.

\* \* \* \* \*